July 10, 1951 E. S. McLARN 2,559,651

TELEPHONE SUBSET

Filed Sept. 23, 1944 4 Sheets-Sheet 1

INVENTOR.
ERNEST S. McLARN

BY J. P. [signature]

ATTORNEY

July 10, 1951 E. S. McLARN 2,559,651

TELEPHONE SUBSET

Filed Sept. 23, 1944 4 Sheets-Sheet 2

INVENTOR.
ERNEST S. McLARN

BY [signature]

ATTORNEY

July 10, 1951 E. S. McLARN 2,559,651

TELEPHONE SUBSET

Filed Sept. 23, 1944 4 Sheets-Sheet 3

INVENTOR.
ERNEST S. McLARN

BY [signature]

ATTORNEY

INVENTOR.
ERNEST S. McLARN
BY
ATTORNEY

Patented July 10, 1951

2,559,651

UNITED STATES PATENT OFFICE 2,559,651

TELEPHONE SUBSET

Ernest S. McLarn, Manhasset, N. Y., assignor to International Standard Electric Corporation, New York, N. Y., a corporation of Delaware Application September 23, 1944, Serial No. 555,419

3 Claims. (Cl. 173—324)

The improvements of the present invention relate to telephone subscriber station equipment in general and features thereof more particularly to subscriber sets of the type composed of a supporting or base unit within which is contained the whole or a part of a subscriber's substation electrical equipment such as described in my Patent No. 2,226,734 dated December 31, 1940. The latter in the instance of a dialing subset, may comprise the usual cradle switch mechanism, condenser, ringer, induction coil and dialing mechanism and multiple connection and terminal block for interconnecting the respective components. As a part thereof the customary handset is operatively connected in the conventional manner wherein it has cradle support upon the base unit and operates the usual switching spring nest upon its reception and removal.

A particular object of the present invention is to incorporate in a structurally advantageous arrangement improved features in the manufacture of the subset units and particularly in the construction of the interconnecting or terminal block portions thereof to the end of effecting very substantial economies in the production costs by a material simplification of the provision for and method of making the numerous terminal connections as required in a device of this type. In accordance therewith there is provided a terminal block structure composed initially of an integral skeletonized multiple connector or conductor member including terminal bushings formed therewith and molded within a plastic insulating and protective body. The multiple connector composed of the multiple arrangement of conductors, or connecting strap portions, between the terminal bushings likewise includes tie portions interconnecting certain of the straps and terminal bushing portions in such manner as to produce a self-sustaining unit of the required strength and rigidity for maintaining proper relative position of the parts for handling and in the process of manufacture. These tie portions subsequent to the molding of the skeleton conductor with the supporting and sustaining plastic material are severed such as by drilling in a single operation.

The multi-connector unit is further made as a die casting and in a manner and of a form wherein the tie portions are connected therewith so as to be positioned in a horizontal plane below that of the straps. In consequence, the severing of the tie portions is permitted by a drilling operation with the employment of a multiple drill press with a minimum drilling requirement and without danger of severing or impairing of the connector straps by non-alignment or deflection of drills in the severing operation; an important factor under conditions of close spacing. The improved multi-strap structure embodies other important features and advantages as hereinafter described contributing to economy as compared to the employment of separate and exposed strapping connections as heretofore used in instruments of the type and which entailed many operations, with resulting high cost, in assembly. Included in the additional advantages, incident to the integrating of the terminal posts with the conductor strap connections, is that the latter provide the required mechanical bonding means for the terminal studs with the plastic material thereby to permit of the multiple die casting of the terminal studs with vertical separation of the forming dies. Further features incorporated therewith include a vertical extension and projection of certain of the connectors to permit of direct attachment thereto of the contact springs of the usual spring nest thereby eliminating the requirement of strap connection thereto with a further desirable reduction in the number of connections required. The improved structure further includes special features in the formation of the terminal block having an integral arrangement therewith of the plunger block or bearing bracket for the cradle plunger and likewise for protectively enclosing the spring nest assembly with special provision for drainage as protection against condensed moisture which is an important consideration under certain adverse climatic conditions.

The referred to and other features and advantages of the present improvements will be more fully understood by reference to the accompanying drawings wherein like reference characters are applied to the corresponding parts in the several views.

Figure 1:
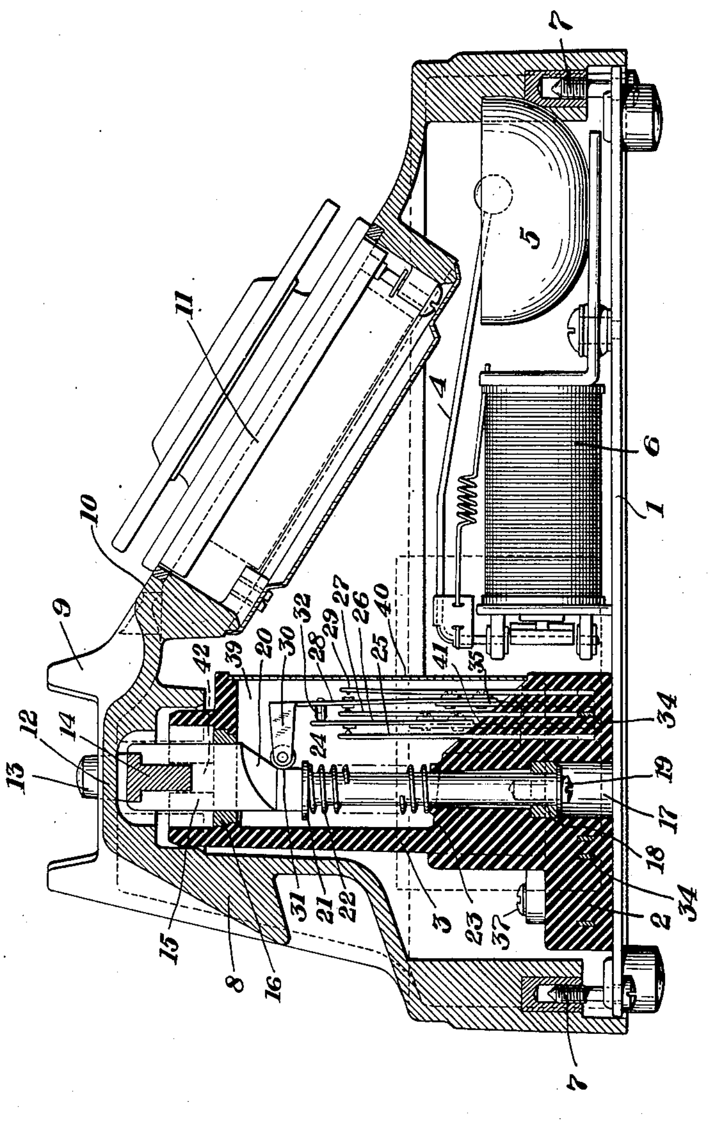
Fig. 1 is a central vertical section view of a subscriber's subset of the dialing control desk type.

Referring to the drawings wherein there is illustrated one embodiment of a desk type subset equipped for dial circuit control and embodying the features of the present invention the main components of the supporting structure thereof include the base 1 upon which is mounted the terminal block 2, a plunger bearing block 3 and operating equipment such as the usual condenser, ringer magnets, operating striker 4, signal bell 5 and induction coil 6. To the base there is secured by means of screws 7 a protective cover or housing 8. This housing 8 in the conventional manner is of a form for protectively enclosing the operating equipment and has provided at its upper rear portion the cradle forming lugs 9. It has a forwardly and downwardly inclined wall 10, providing support for the dial control mechanism 11 in the customary arrangement. This housing 8 is desirably formed of insulating plastic arranged to provide a dust-tite connection with the base 1. The housing at its upper portion is provided with the horizontal wall 12 formed with oppositely spaced apertures for the reception and projection therethrough of plunger contact lugs 13 integrally formed with a plunger extension bridge 14 attached to the switch operating plunger 15. The plunger is movable vertically within upper bearings 16 and a lower bearing aperture 17, the upper bearing being supported as shown by the plunger block or bracket 3 and the lower bearing aperture extending through the terminal block, with a bearing washer 18 closely fitted therein and secured by a screw 19. The switch operating plunger is formed with the inclined camming surface 20 and with a bearing collar 21 engaged by compression spring 22 fitted on the plunger and interposed between the collar and a bearing shoulder 23 of the bearing block 3. The spring accordingly acts normally to elevate the plunger 15 in response to removal of the usual handset from the cradle in the customary manner. This handset and its electrical connections are omitted from the drawing as it is well known and conventional in construction not having any direct relation to the features of the present invention. The spring nest indicated generally by 24 is composed of the usual five contacts 25, 26, 27, 28 and 29 and of which the contact spring 28 is upwardly extended and formed with an apertured yoke 30 laterally extended toward the plunger and supporting a pivoted anti-friction roller 31 positioned to be engaged by the deflecting cam 20. The spring contact 28 as will be noted is connected by an insulating stud 32 to the contact spring 26 whereby the latter is given a similar shifting movement in response to depression of the plunger and resulting cam action. The spring nest in the manner understood effects the closing of contacts for closing of the signal circuit and opening of the line circuits upon depression of the plunger by the weight of the handset when positioned in the cradle and upon the elevation of the plunger by the spring upon removal of the handset permits the closing of the receiver and transmitter or line circuits. As is customary practice the connections are made from the spring nest contacts and likewise from the associated operating equipment including the condenser ringer magnets, induction coil and dialing mechanism contacts and terminals to a multiplicity of terminal members mounted on the terminal block 2 and these terminal members are suitably inter-connected by conductors or strapping for the completion of the respective operating circuits. The connector or terminal block, particularly in the instance of a dial impulsed circuit arrangement, accordingly requires a large number of terminals and strap connections varying with relation to the specific circuit arrangements and in the present instance is shown as comprising 19 terminals with appropriate connector straps or conductors adapting it to a circuit arrangement of the type as schematically shown in Fig. 6.

In the production methods as at present practiced in making the terminal block connections, separate conductors or conductor straps are employed for making of the interconnection between the circuit related terminals which are customarily soldered or welded to the terminal bushings or posts. As will be appreciated this involves a costly operation requiring skilled labor for satisfactory results in addition to having other uneconomic objections incident to the stocking and shaping of the varied connector lengths, the required careful removal of excess and loose solder and the objections of acid influence incident to the employment of soldering flux. It has moreover been customary incident to space requirements as related to the soldering operation to employ terminal connections both on the upper and lower surfaces of the terminal block resulting in assembly arrangements inconvenient for inspection and repair.

In accordance with the present invention a materially improved and structurally advantageous terminal block arrangement is provided wherein the terminal block structure is composed of an integral skeletonized multiple connector and terminal bushing unit formed as a die casting and molded within an insulating and protective body of suitable plastic material. The multiple connector of conducting metal is provided in an advantageous arrangement with tie portions interconnecting certain of the straps and bushings for maintaining their proper relative position, these tie portions being positioned to lie in a horizontal plane below that of the conductor strap connections thereby to permit of their being severed subsequent to the molding for the required electrical separation of the circuit connections by drilling and with a minimum drilling requirement. The improved arrangement moreover provides for the positioning of the terminal connections on the upper surface of the terminal block only, thereby providing that the arrangement as disclosed have the terminal block and associated equipment such as condensers, coil and bell ringing devices mounted upon the upper surface of the base plate thus providing a conveniently accessible organization of the component parts with respect to convenience of assembly, inspection and maintenance requirements. The improved arrangement further combines with the terminal block the integral formation therewith of the plunger bearing block and the mounting of the spring nest which are correspondingly affixed to the base member and accessible upon removal of the housing member 8.

Figure 6:
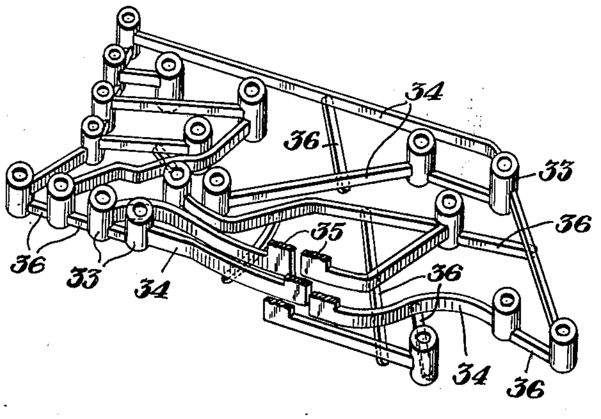
Fig. 6 is a perspective view of the skeletonized multiple connector and terminal stud unit.
Figure 7:
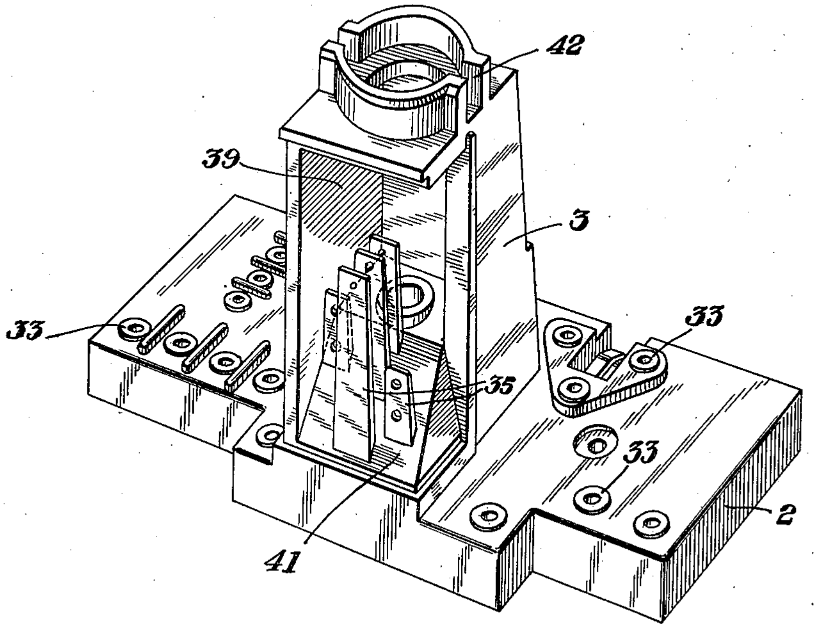
Fig. 7 is a perspective view of the terminal and plunger block unit.

In the improved design and construction the multiple connector and terminal bushing unit is die-cast in the form as best illustrated in Fig. 6 having a multiplicity of cylindrical bushings 33 in varied spacing relation as desired, these bushings being connected by the horizontally positioned conductor bars or straps 34. The straps 34 are desirably of vertically positioned bar formation and are arranged in the same horizontal plane with the required spacing for electrical separation and with certain of the straps as indicated provided with vertical extensions 35 for attachment to the spring nest contacts. For the purpose of retaining the integrally formed bushings and straps as an initial unit prior to the molding assembly tie bars 36 are integrally cast therewith for interconnecting the members of the multiple connector and bushing unit. As shown these tie bars in some instances interconnect the strapping, bushings and adjacent strapping and bushing portions and are arranged to occupy a horizontal plane immediately underlying the strapping and integrated with the lower edge portions thereof. The unit so formed is united with the terminal block by molding of the terminal block plastic material thereon and desirably with the bushings slightly extended above the upper surface of the plastic block. The lower portions of the bushings together with the strapping connections and tie members are fully encompassed or enclosed by the plastic material to be protectively insulated and as so embedded the strapping connections provide mechanical bonding for the bushings in the plastic material as is desirable in the absence of other bending deformations of the bushings not permitted in the multiple die casting as disclosed. The upper end portions of the bushings are tapped for the reception of terminal bonding screws 37, this operation being performed either before or after the molding assembly.

Figure 3:
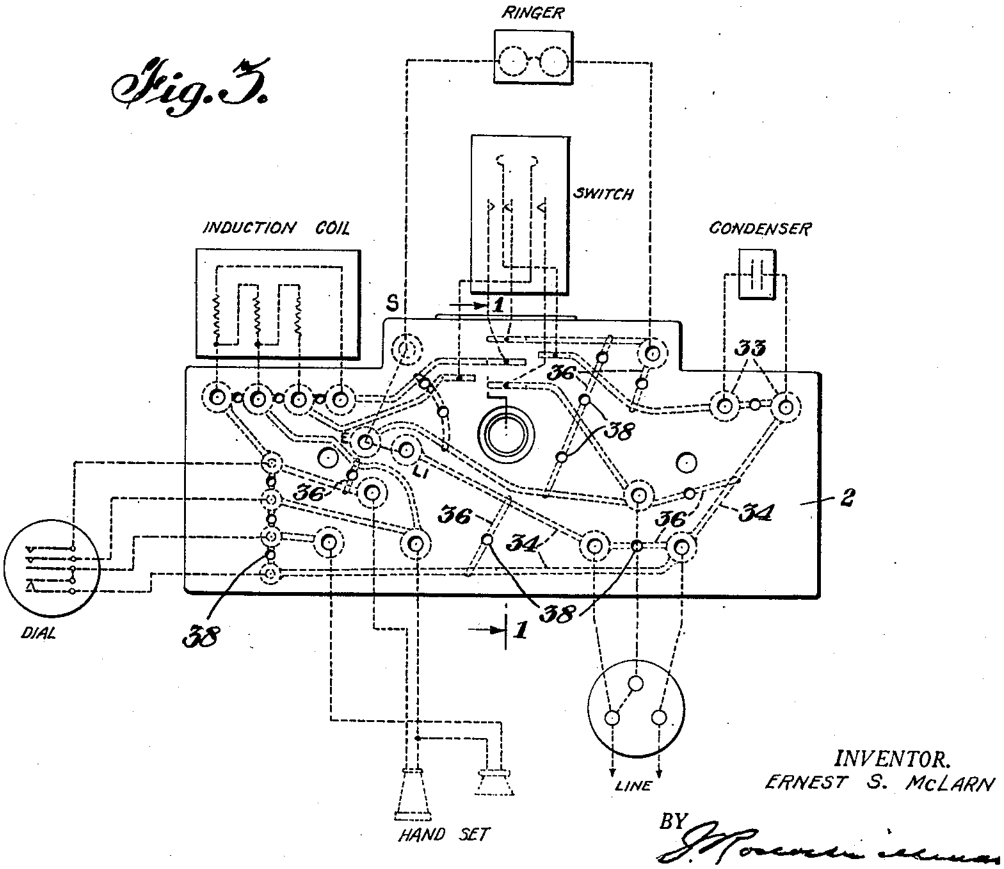
Fig. 3 is a bottom plan view thereof showing the skeletonized multiple conductor and terminal stud unit assembly in dotted lines and with a schematic showing of the circuit connections.
Figure 4:
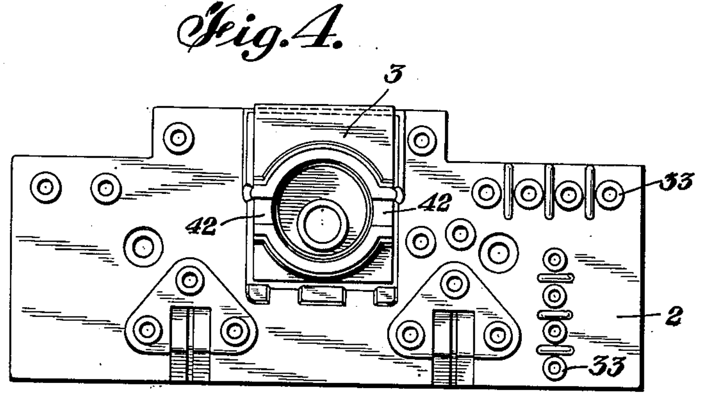
Fig. 4 is a top plan view of the multiple connector and plunger bearing bracket unit.

For the purpose of the required electrical separation of the connector straps and bushing elements the tie bars 36 are severed preferably by means of a gang drill press and by drilling from the underside of the block through the plastic and the tie bars at positions as indicated by the circles 38 in the drawing (Fig. 3). The depth of this drilling is sufficient to properly sever the tie connections and does not enter within the plane of the strapping a distance sufficient to impair the efficiency thereof should deflection or improper alignment of the drill encroach upon the vertical plane or position of the strap material. The arrangement is accordingly such as to permit of a redrilling operation without impairment of the electrical connections in addition to reducing the drilling requirement to a desired minimum.

The resulting terminal and connector block is a united, rigid unit structure wherein the terminal bushings and conductor straps are integrally formed removing all danger of loose and improper connections. The improved die cast unit and skeleton formation of the bushings and strapping further permits of such varied distribution of the bushings with non-linear strapping connections therebetween as may be desired for more accessible and convenient terminal arrangements and moreover to accommodate and provide clearance for other structural features within the block such for instance as the provision of the centered bearing bore or aperture 17 and the lower bearing end of the plunger operating therein as shown.

The structural arrangement permits of the improved and desirable embodiment of the plunger block 3 as an integral part of the terminal block and the inclusion of the plunger and associated spring nest operated thereby in secured or fixed relation to the block and the base mounting therefor whereby on removal of the cover or housing the complete operating unit is made accessible for inspection and testing. As a further feature of the present improvements the plunger block 3 is formed to provide a rear and side wall enclosure for the spring nest assembly positioned within the opening or socket 39 so formed. This socket is open at the front and one side and formed to be closed and protectively sealed by an angular wall panel 40.

Figure 2:
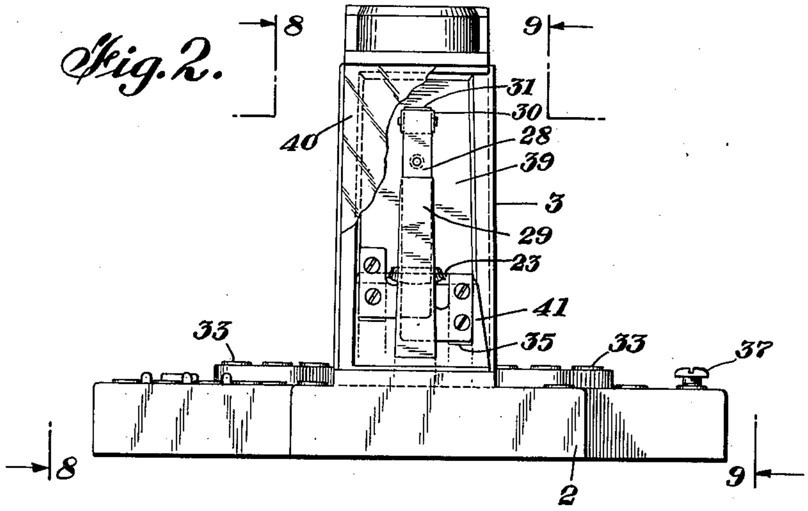
Fig. 2 is a view in front elevation of the improved terminal block and plunger bearing bracket assembly.

An important feature of my improved arrangement, as best shown in Figs. 1, 2, 6 and 7 is the provision of the integral vertical extensions 35, of the strapping associated with the spring nest contacts to project above the supporting plastic. In the improved structure as shown these vertical extensions, having a degree of upward taper for removal from the mold, are in an arrangement with three centrally aligned extensions providing the stationary spring nest contacts 25, 27 and 29 and with laterally displaced, tapped extensions upon which are mounted by securing screws the resilient spring nest contacts 26 and 28. As best shown in Fig. 2 resilient spring contacts 26 and 28 have their lower securing end portions formed as angular extensions to permit of their being attached to the supporting strap extensions in a manner to provide for convenient access to the securing screws therefor. The improved spring nest mounting arrangement further includes a special formation of the plastic supporting body having its upper forward wall or surface 41 downwardly inclined from the shoulder surface 23 to the panel opening. As a result provision is made for the drainage of the socket or spring nest compartment as insurance against circuit interference by moisture condensation which is an important consideration in certain locations of use. The bottom edge of the panel, as will be understood, may be provided with small openings for the escape of the condensate.

Figures 5, 8, 9:
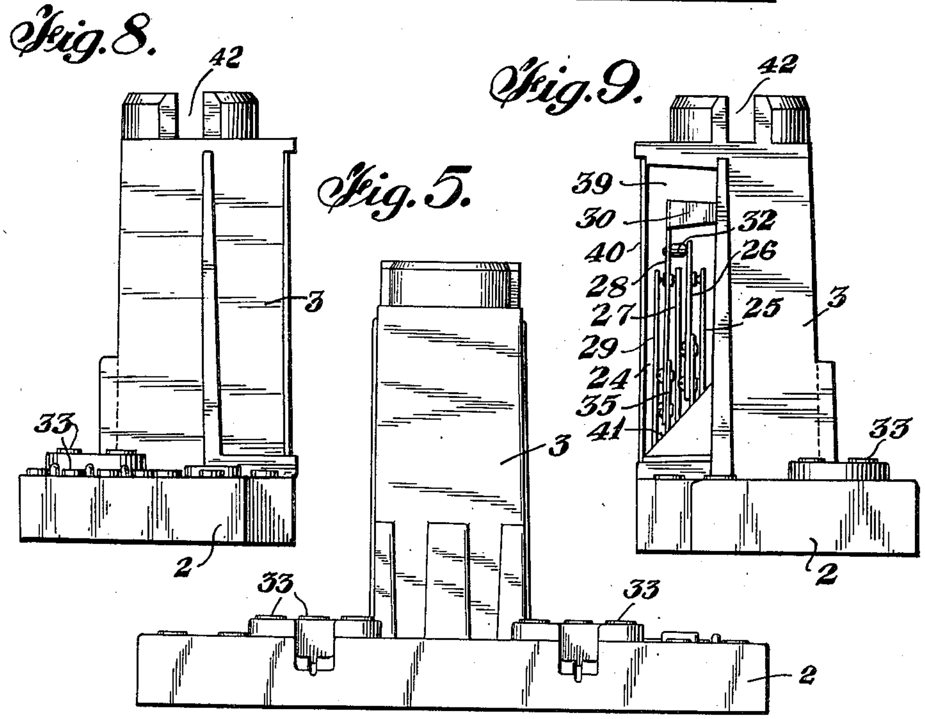
Fig. 5 is a view thereof in rear elevation.
Fig. 8 is a view of the terminal and plunger block in elevation taken from the left hand side.
Fig. 9 is an end view of the multiple connector block and plunger bearing bracket unit taken from the right hand side and with a portion of the protective cover removed to illustrate the spring nest parts.

The upward extensions of the connectors providing the spring nest terminals as best shown in Figs. 1, 2 and 9 are in an arrangement wherein these terminals 35 project through the inclined wall 41. These terminals are as shown positioned in forward and rearward alignment in a double row with the rearmost terminals extended upwardly a greater distance than that of the forwardly positioned terminals thereby to facilitate accessibility in the attachment thereto of the contact springs.

As will be appreciated the employment of the improved skeletonized strapping connector and terminal bushing unit offers many substantial advantages and economies in the production of the terminal blocks particularly as related to the presently employed methods of assembly wherein individual connections are made to the numerous terminal bushing elements. Included among the advantages incident to the making of the skeletonized unit as an integral die casting is that this method of manufacture accommodates for the variations in horizontal as well as vertical distribution of the bushings together with the varied directional connecting of the terminal bushings by conductor strapping so as to provide for the required spacings between the strapping as well as other clearances such as for the lower end of the operating plunger in a manner to permit of unit die casting of the strapping with the terminal bushings thereby eliminating the requirement of soldering therebetween. This integrating arrangement allows of the bushings being formed with plain outer surfaces and with a slight upward tapering as required in die casting operations in that the strapping, integral therewith, provides the means for mechanical bonding of the bushings with the plastic material when molded therewith. The further improved structure wherein the plunger bearing block is integrally formed with the terminal block member provides a rigid aligned assembly which further incorporates therewith the desirable features of the direct mounting of the spring nest upon the vertical terminal extensions of the strap so as to provide rigid mounting therefor in a fixed relation to the plunger bearings. In addition the special formation of the mounting arrangement as disclosed provides for protective drainage for the disposal of condensed moisture within the improved form of protective housing provided for the enclosure of the spring nest and related parts. The latter feature wherein the enclosing compartment is formed by the block with both front and sidewall openings which is closed by a protective two wall panel 40 is particularly advantageous in giving improved accessibility to the spring nest and its mounting to facilitate inspection and repair. As will be noted in Fig. 7 the upper end of the plunger block is formed with an annular flange provided with opposite guideway slots 42 for the reception of the plunger bridge member 14.

While a preferred embodiment of my invention has been described and shown for the purpose of illustration it will be noted that modifications, adaptations and alterations thereof as may occur to one skilled in the art may be made within the scope of the invention as defined in the appended claims.

What is claimed is:

1. A terminal connector block for a telephone subset comprising a relatively rectangular mass of insulating material having embedded therein a plurality of terminal elements together with conductor straps, said conductor straps connecting circuit related terminal elements, extensions on certain of said conductor straps forming means to support a plurality of switch springs, a plunger block formed integral with said mass, said plunger block adapted to provide a housing for said switch springs, said extensions being coated with said insulating material, means to drain condensate from said extensions, means in said block adapted to guide a switch plunger, said guide means having a vertically tapered cylindrical aperture, a shoulder at one end of said aperture adapted to form a seat for a bearing washer, and a collar at the other end of said aperture adapted to form a spring seat.

2. A terminal connector block for a telephone subset comprising a relatively rectangular mass of insulating material having embedded therein a plurality of terminal elements together with conductor straps, said conductor straps connecting circuit related terminal elements, extensions on certain of said conductor straps forming means to support a plurality of switch springs, a plunger block formed integral with said mass, said plunger block adapted to provide a housing for said switch springs, said extensions being coated with said insulating material, means to drain condensate from said extensions, means in said block adapted to guide a switch plunger, said guide means having a vertically tapered cylindrical aperture, a shoulder at one end of said aperture adapted to form a seat for a bearing washer, a collar at the other end of said aperture adapted to form a spring seat, an annular flange on said plunger block, guideway slots in said flange adapted to receive a plunger bridge member, a cover for said housing, and means to attach said connector block to said telephone subset and drainage slots in said cover.

3. A terminal connector block for a telephone subset comprising a relatively rectangular mass of insulating material having embedded therein a plurality of terminal elements together with conductor straps, said conductor straps connecting circuit related terminal elements, extensions on certain of said conductor straps forming means to support a plurality of switch springs, a plunger block formed integral with said mass, said plunger block adapted to provide a housing for said switch springs, said extensions being coated with said insulating material, means to drain condensate from said extensions, means in said block adapted to guide a switch plunger, said guide means having a vertically tapered cylindrical aperture, a shoulder at one end of said aperture adapted to form a seat for a bearing washer, a collar at the other end of said aperture adapted to form a spring seat, an annular flange on said plunger block, guideway slots in said flange adapted to receive a plunger bridge member, a cover for said housing having drainage slots, means to attach said connector block to said telephone subset, and means on said plunger block to cooperate with said telephone subset for aligning said plunger block, whereby said plunger guide means is adapted to cooperate with similar guide means in said telephone subset.

ERNEST S. McLARN.

REFERENCES CITED

The following references are of record in the file of this patent:

UNITED STATES PATENTS

| Number | Name | Date |
|---|---|---|
| 1,579,614 | Hornig | Apr. 6, 1926 |
| 1,794,831 | Caruso | Mar. 3, 1931 |
| 2,094,283 | Schleimer | Sept. 28, 1937 |
| 2,226,734 | McLarn | Dec. 31, 1940 |
| 2,279,713 | McLarn | Apr. 14, 1942 |
| 2,297,488 | Luderitz | Sept. 29, 1942 |
| 2,312,970 | McLarn | Mar. 2, 1943 |
| 2,348,592 | Beardsley | May 9, 1944 |

FOREIGN PATENTS

| Number | Country | Date |
|---|---|---|
| 344,677 | Great Britain | Mar. 12, 1931 |
| 515,354 | Great Britain | Dec. 4, 1939 |